US00RE48036E

(19) United States
(12) Reissued Patent
Bast

(10) Patent Number: US RE48,036 E
(45) Date of Reissued Patent: Jun. 9, 2020

(54) HANDLE

(71) Applicant: Gauthier Biomedical, Inc., Grafton, WI (US)

(72) Inventor: Robert Bast, Sheboygan Falls, WI (US)

(73) Assignee: Gauthier Biomedical, Inc., Grafton, WI (US)

(21) Appl. No.: 29/628,067

(22) Filed: Dec. 1, 2017

Related U.S. Patent Documents

Reissue of:
(64) Patent No.: Des. 787,294
Issued: May 23, 2017
Appl. No.: 29/545,866
Filed: Nov. 17, 2015

(51) LOC (12) Cl. ..... 08-05
(52) U.S. Cl.
USPC ..... D8/107
(58) Field of Classification Search
USPC ..... D8/107, 300, 303, 307, 321, 322; D23/250, 251, 253, 254; D7/393, 394, D7/395, 396, 533, 535, 543, 545, 548; D24/133
CPC ..... Y10T 16/469; Y10T 16/44; Y10T 16/466; Y10T 16/4713; A46B 220/302; A46B 5/021; A46B 13/022; B25G 1/10; B25G 3/04; B25G 3/00; Y10S 16/12; Y10S 16/19; Y10S 16/41; Y10S 16/60; Y10S 16/40
See application file for complete search history.

(56) References Cited

U.S. PATENT DOCUMENTS

D146,518 S * 3/1947 Ramsthal ..... D7/395
D191,751 S * 11/1961 Woodall ..... 280/821
D230,927 S * 3/1974 Goletski ..... D8/303
D258,988 S * 4/1981 Leonard ..... D24/147
5,829,099 A * 11/1998 Kopelman ..... B25G 1/102 16/430
D408,218 S * 4/1999 Thomas ..... D7/401.2
(Continued)

*Primary Examiner* — Philip S Hyder
(74) *Attorney, Agent, or Firm* — Boyle Fredrickson, S.C.

(57) CLAIM

The ornamental design of a handle, as shown and described.

DESCRIPTION

*More than one reissue application has been filed for the reissue of U.S. Pat. No. D787,294. The reissue applications are application Nos. 29/628,067 and 29/633,674, which are divisional reissues of U.S. Pat. No. D787,294.*

FIG. 1 is an isometric view of a handle according to my new design;
FIG. 2 is a front elevation view thereof;
FIG. 3 is a rear elevation view thereof,
FIG. 4 is a top plan view thereof;
FIG. 5 is a bottom plan view thereof; [and,]
FIG. 6 is a right side elevation view thereof, the left side elevation view being a mirror image thereof[.]*;*
*FIG. 7 is an isometric view of a second embodiment of a handle according to my new design;*
*FIG. 8 is a front elevation view' thereof:*
*FIG. 9 is a rear elevation view thereof;*
*FIG. 10 is a top plan view thereof;*
*FIG. 11 is a bottom plan view thereof; and,*
*FIG. 12 is a right side elevation view' thereof, the left side elevation view being a mirror image thereof.*
*The broken lines depict portions of the handle in which the design is embodied that are not considered part of the claimed design.*

1 Claim, 12 Drawing Sheets

Figure 1:
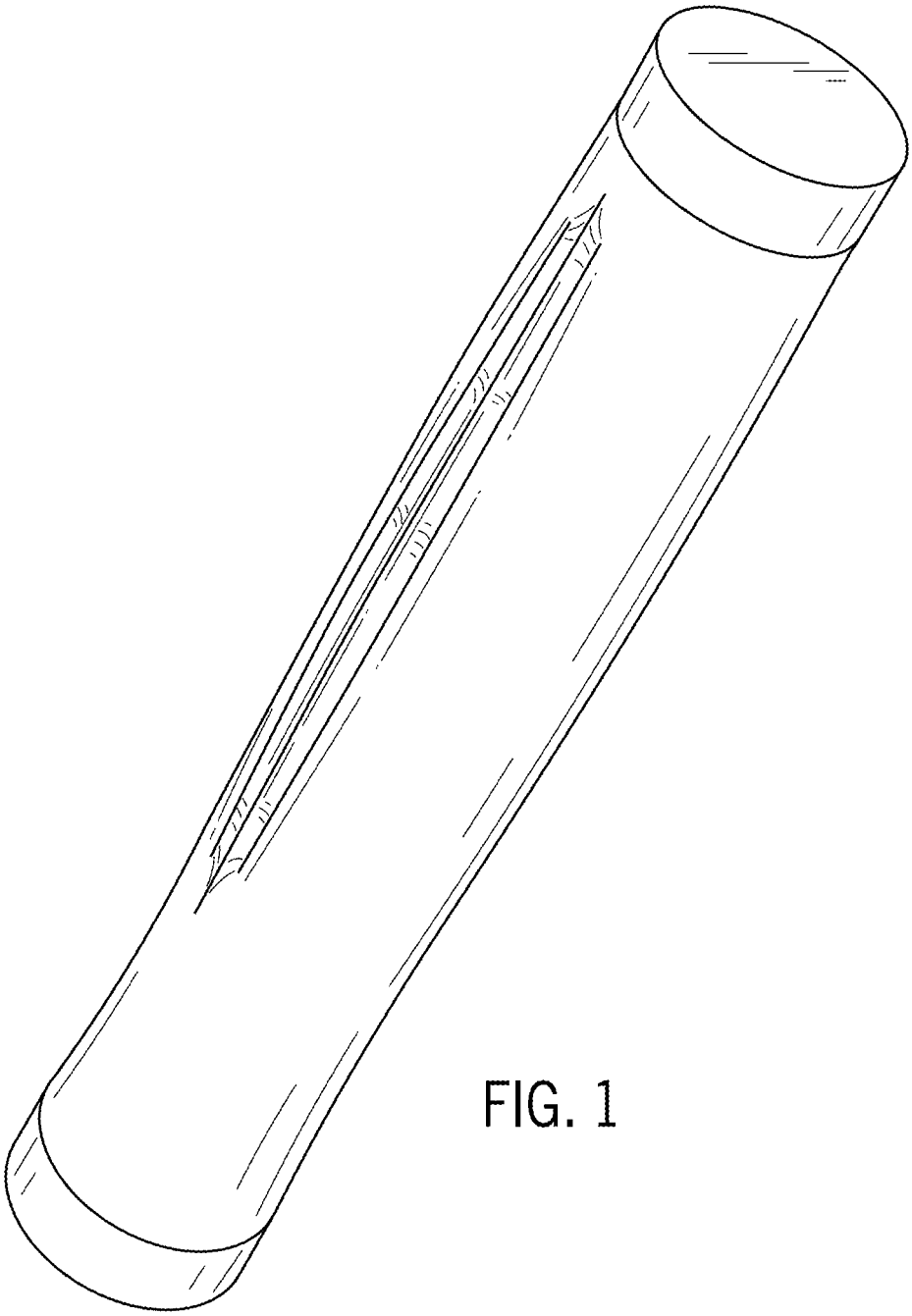
Figure 2:
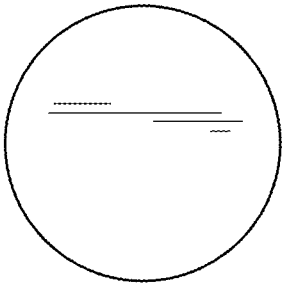
Figure 3:
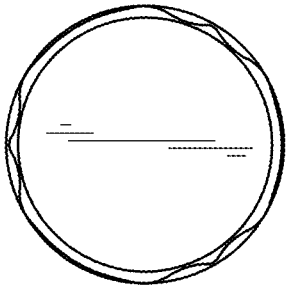
Figure 4:
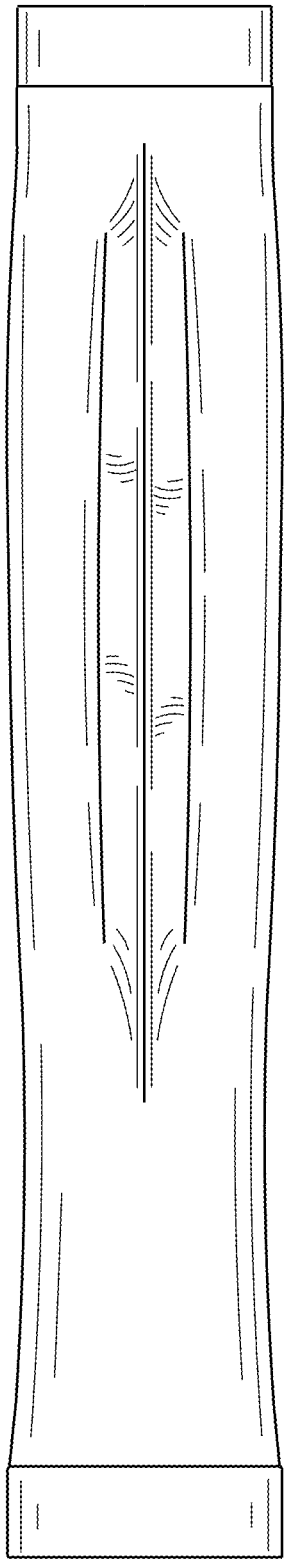
Figure 5:
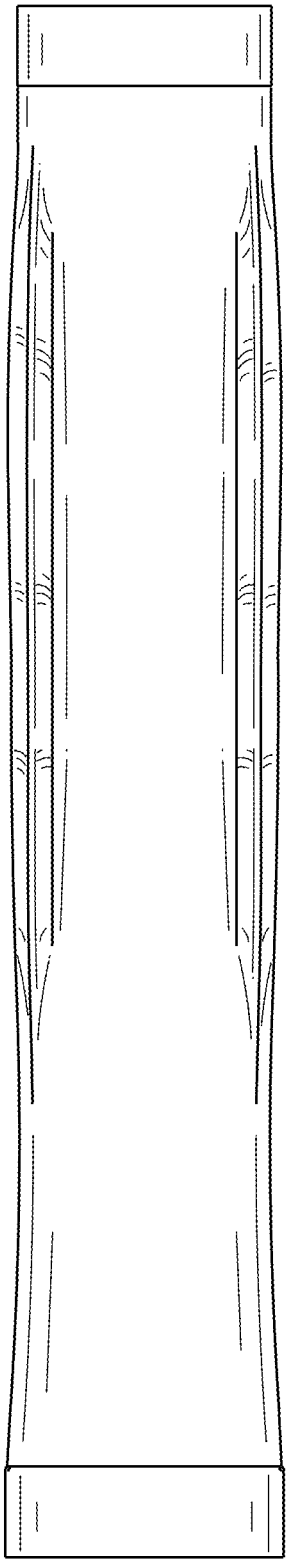
Figure 6:
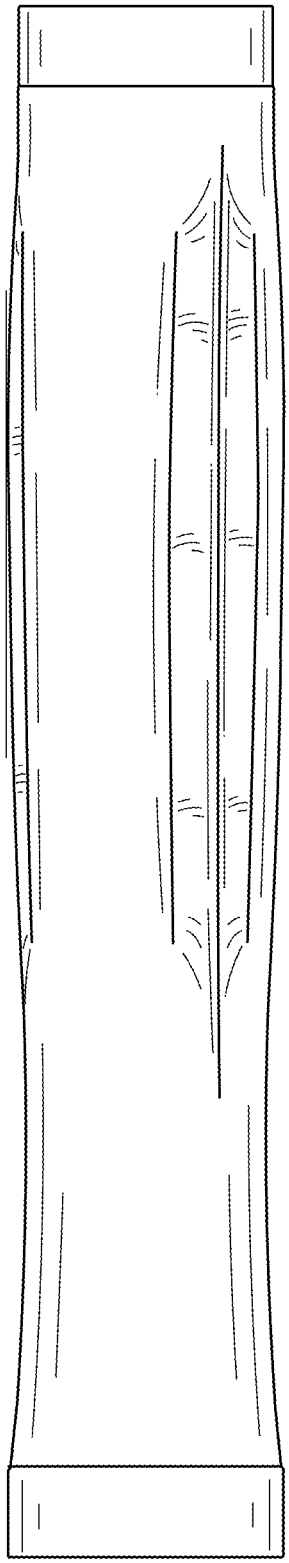

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D481,290 | S | * | 10/2003 | Thompson | D8/107 |
| D546,162 | S | * | 7/2007 | Trotta | D8/303 |
| D577,794 | S | * | 9/2008 | Sanz Fernandez | D23/250 |
| D633,363 | S | * | 3/2011 | Quinlan | D8/303 |
| D648,851 | S | * | 11/2011 | Copeland | D24/112 |
| 8,235,435 | B2 | * | 8/2012 | Campbell | A47J 43/288 16/430 |
| D701,439 | S | * | 3/2014 | Macor | D8/107 |
| D704,337 | S | * | 5/2014 | Dunn | D24/147 |
| D707,527 | S | * | 6/2014 | Hsieh | D8/107 |
| 8,770,880 | B2 | * | 7/2014 | Hecker | B43K 5/005 16/430 |
| D718,011 | S | * | 11/2014 | Lentine | D32/52 |
| D723,349 | S | * | 3/2015 | Henderson | D8/107 |
| D725,202 | S | * | 3/2015 | Hunt | D21/662 |
| D774,376 | S | * | 12/2016 | Zhang | D8/107 |
| 2012/0246855 | A1 | * | 10/2012 | Zeinert | A46B 5/0095 15/145 |

* cited by examiner

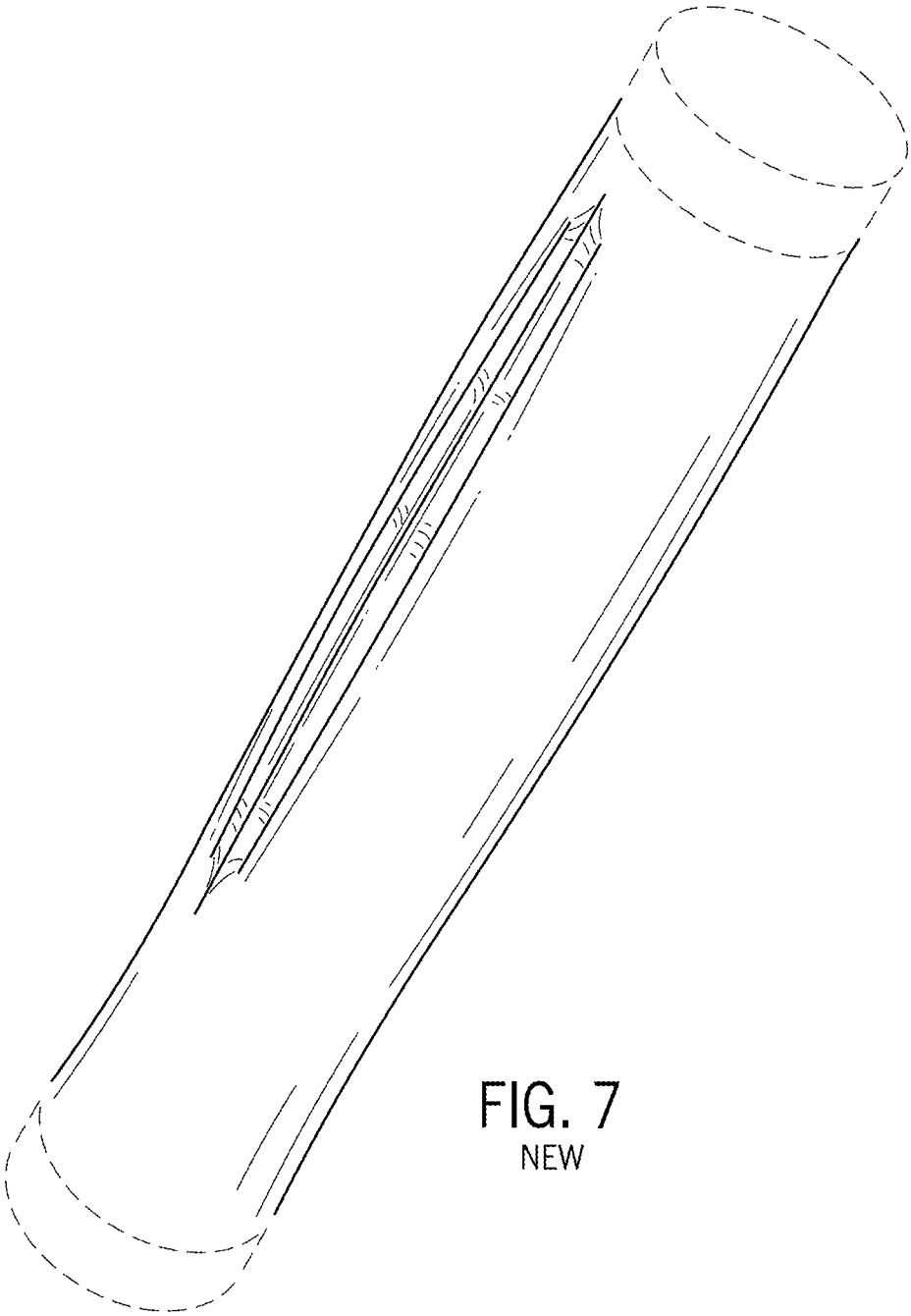
FIG. 7
NEW

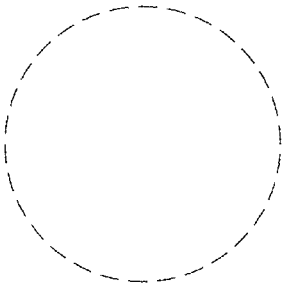
FIG. 8
NEW

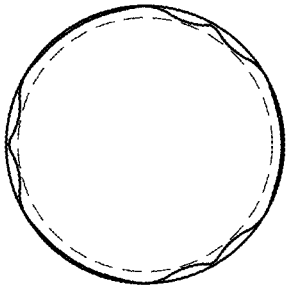
FIG. 9
NEW

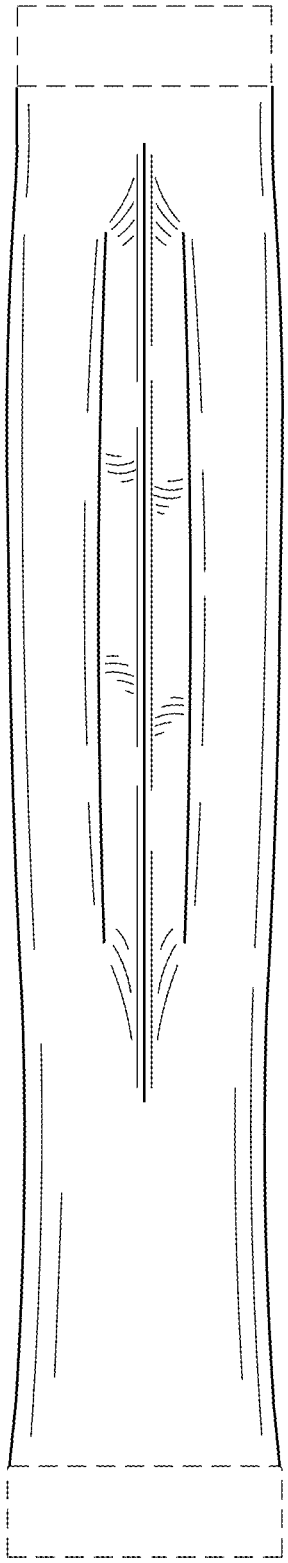
FIG. 10
NEW

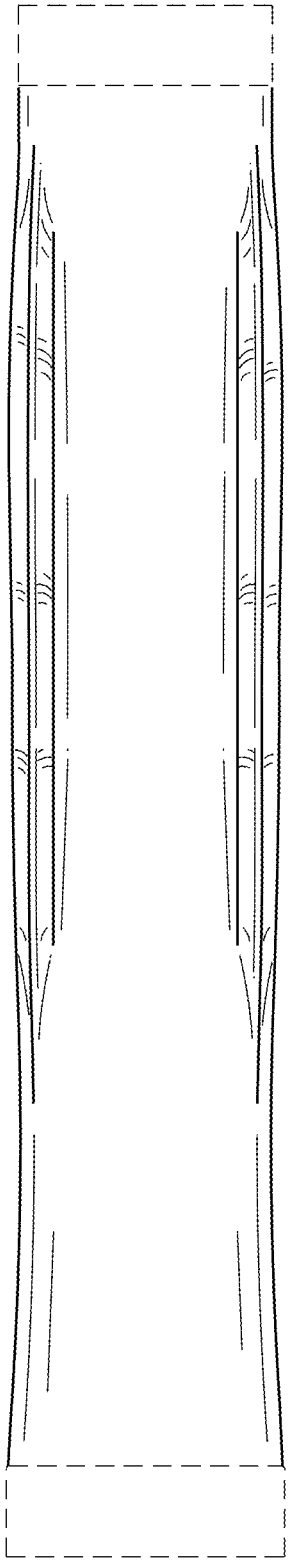
FIG. 11
NEW

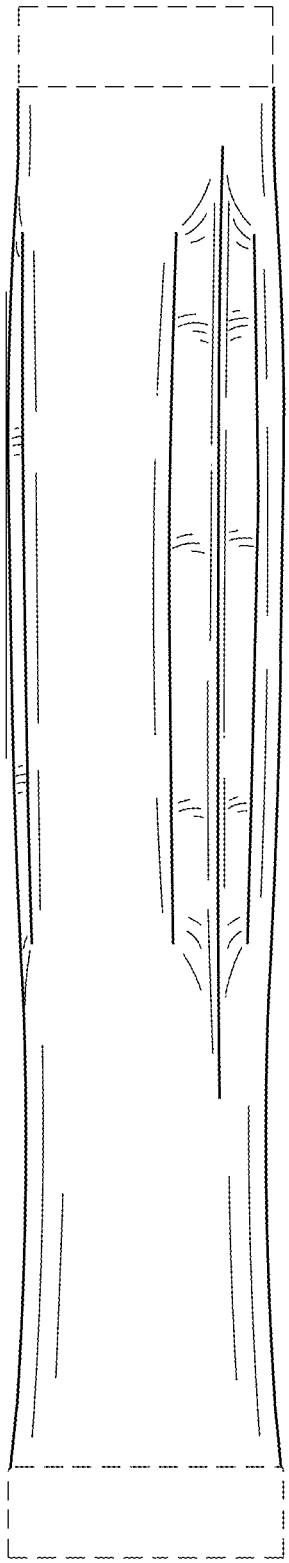
FIG. 12
NEW